US011720390B2

(12) United States Patent
Kogure et al.

(10) Patent No.: US 11,720,390 B2
(45) Date of Patent: Aug. 8, 2023

(54) INFORMATION PROCESSING APPARATUS THAT DETERMINES WHETHER AN EXTENDED APPLICATION CAN REUSE A VIRTUAL MACHINE, METHOD OF CONTROLLING THE SAME, AND STORAGE MEDIUM

(71) Applicant: CANON KABUSHIKI KAISHA, Tokyo (JP)

(72) Inventors: Takeshi Kogure, Toride (JP); Atsushi Ikeda, Toride (JP); Hiroaki Koike, Kokubunji (JP)

(73) Assignee: Canon Kabushiki Kaisha, Tokyo (JP)

(*) Notice: Subject to any disclaimer, the term of this patent is extended or adjusted under 35 U.S.C. 154(b) by 156 days.

(21) Appl. No.: 17/024,773

(22) Filed: Sep. 18, 2020

(65) Prior Publication Data
US 2021/0081230 A1    Mar. 18, 2021

(30) Foreign Application Priority Data
Sep. 18, 2019  (JP) ................................ 2019-169577

(51) Int. Cl.
  G06F 9/455       (2018.01)
  G06F 3/04817    (2022.01)
  G06F 9/50        (2006.01)

(52) U.S. Cl.
  CPC ...... *G06F 9/45558* (2013.01); *G06F 3/04817* (2013.01); *G06F 9/5077* (2013.01);
(Continued)

(58) Field of Classification Search
  CPC ............... G06F 9/45558; G06F 9/5077; G06F 2009/45562; G06F 2009/45575
  See application file for complete search history.

(56) References Cited

U.S. PATENT DOCUMENTS 10,048,974 B1 *  8/2018  Wagner ............... G06F 9/45558
10,318,347 B1 *  6/2019  Wagner ................. G06F 9/5077
(Continued)

FOREIGN PATENT DOCUMENTS

| JP | 2005202652 A | 7/2005 |
| JP | 2014106767 A | 6/2014 |
| JP | 2018-025909 A | 2/2018 |

OTHER PUBLICATIONS

Japanese Office Action issued in corresponding Japanese Application No. 2019-169577 dated Jun. 23, 2023.

*Primary Examiner* — Dong U Kim
(74) *Attorney, Agent, or Firm* — Venable LLP

(57) ABSTRACT

An information processing apparatus that is able to execute an extended application, and a method of controlling the information processing apparatus are provided. The information processing apparatus holds, in a launched state, a virtual machine (VM) for executing the extended application, determines, in a case that the extended application is launched, whether or not the extended application can reuse the VM. In a case that it is determined that the extended application can reuse the VM, the information processing apparatus determines whether or not a VM that can be reused by the extended application is held, and in a case that it is determined that the VM which can be reused by the extended application is held, execute the extended application using the held VM.

14 Claims, 15 Drawing Sheets

(52) U.S. Cl.
CPC .............. *G06F 2009/45562* (2013.01); *G06F 2009/45575* (2013.01)

(56) References Cited

U.S. PATENT DOCUMENTS

| | | | |
|---|---|---|---|
| 10,506,122 B2 | 12/2019 | Kogure | |
| 2014/0149984 A1* | 5/2014 | Takahashi | G06F 9/4856 |
| | | | 718/1 |
| 2016/0092252 A1* | 3/2016 | Wagner | G06F 9/45558 |
| | | | 718/1 |
| 2016/0291990 A1* | 10/2016 | Bhatia | G06F 9/45558 |
| 2018/0004557 A1* | 1/2018 | Bamsch | G06Q 20/102 |
| 2018/0048781 A1* | 2/2018 | Kogure | H04N 1/32625 |
| 2019/0392150 A1* | 12/2019 | Shevade | H04L 61/2517 |

* cited by examiner

FIG. 8

| 801 | 802 | 803 | 804 | 805 | 806 | 807 | 808 |
|---|---|---|---|---|---|---|---|
| FORM NAME | BUTTON ID | FORM IMAGE FILE | PRINT SETTINGS | ICON IMAGE FILE | LOCALIZE | DISPLAY POSITION | USER WHO CAN USE |
| MUSICAL SCORE | 0 | score.dat | Settings1.dat | Icon1.dat | Localize1.dat | START | ALL |
| APPLICATION FORM | 1 | SYORUI.dat | Settings2.dat | Icon2.dat | NONE | END | USER A |

| 901 | 902 | 903 | 904 | 905 |
|---|---|---|---|---|
| APPLICATION ID | BUTTON ID | ICON TITLE | DISPLAY POSITION | ICON IMAGE INFORMATION |
| 1 | 0 | MUSICAL SCORE | START | PIXEL DATA OF Icon1.data |
| 1 | 1 | APPLICATION FORM | END | PIXEL DATA OF Icon2.data |

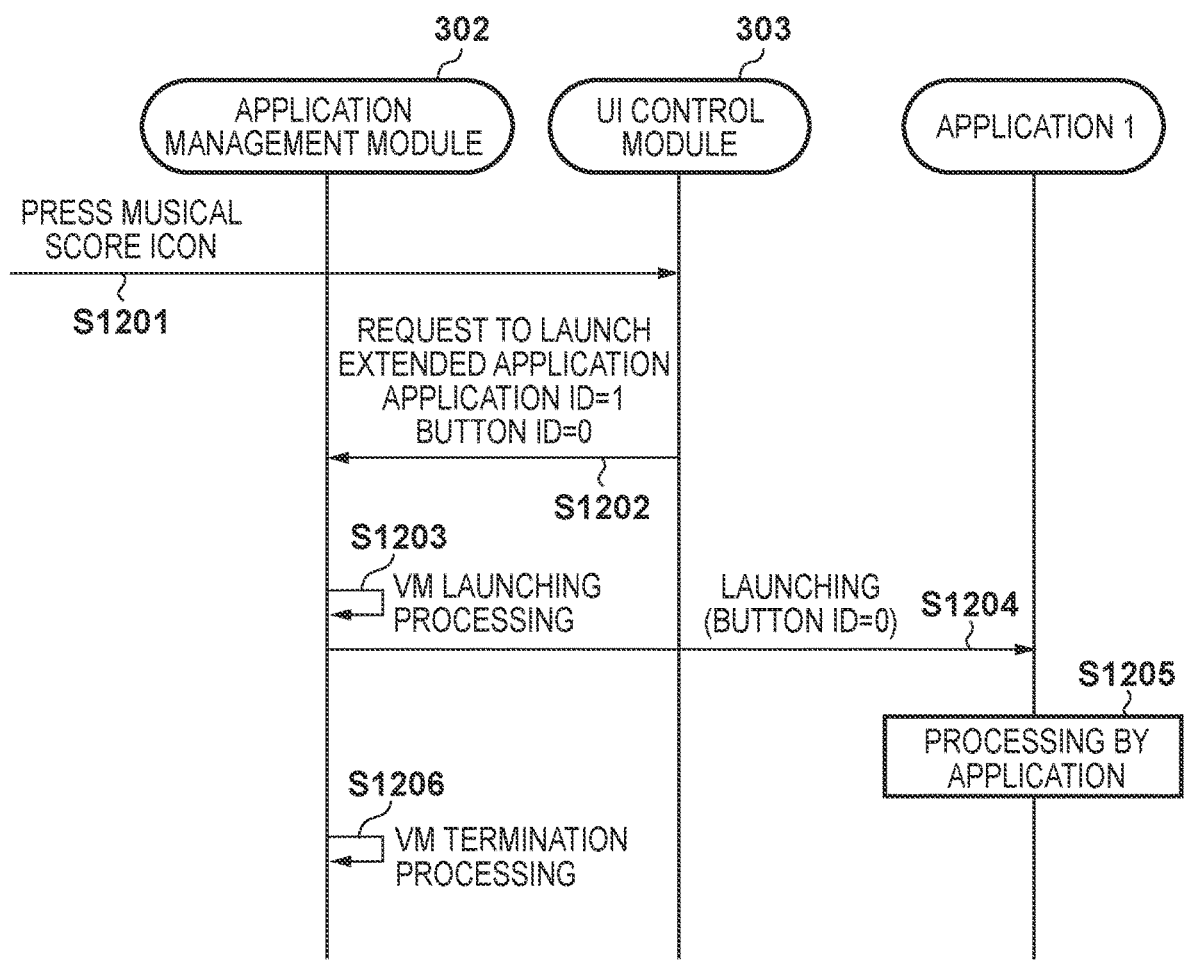

F I G. 18
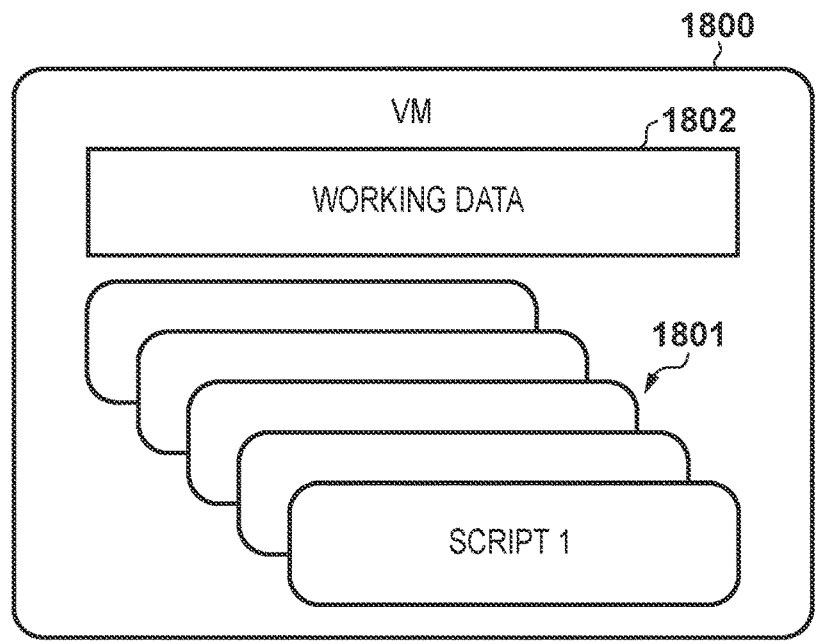
F I G. 19
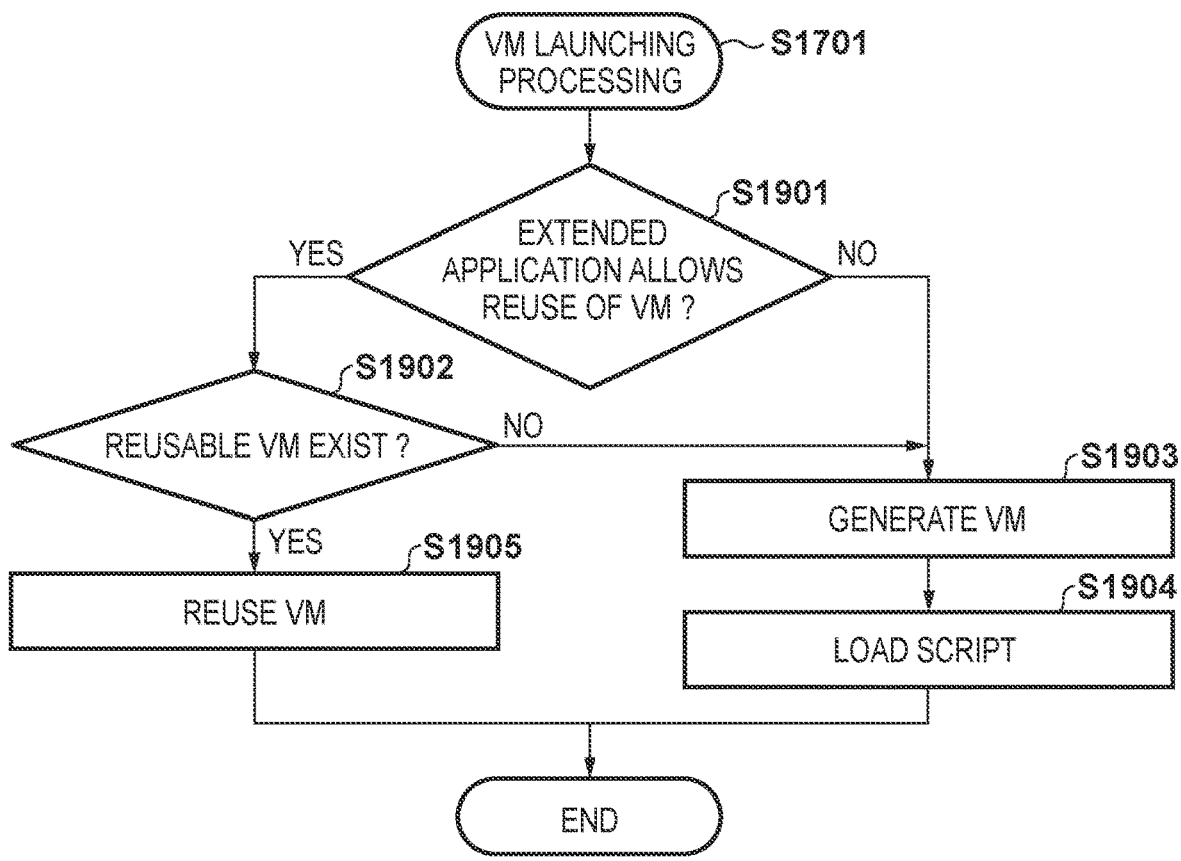

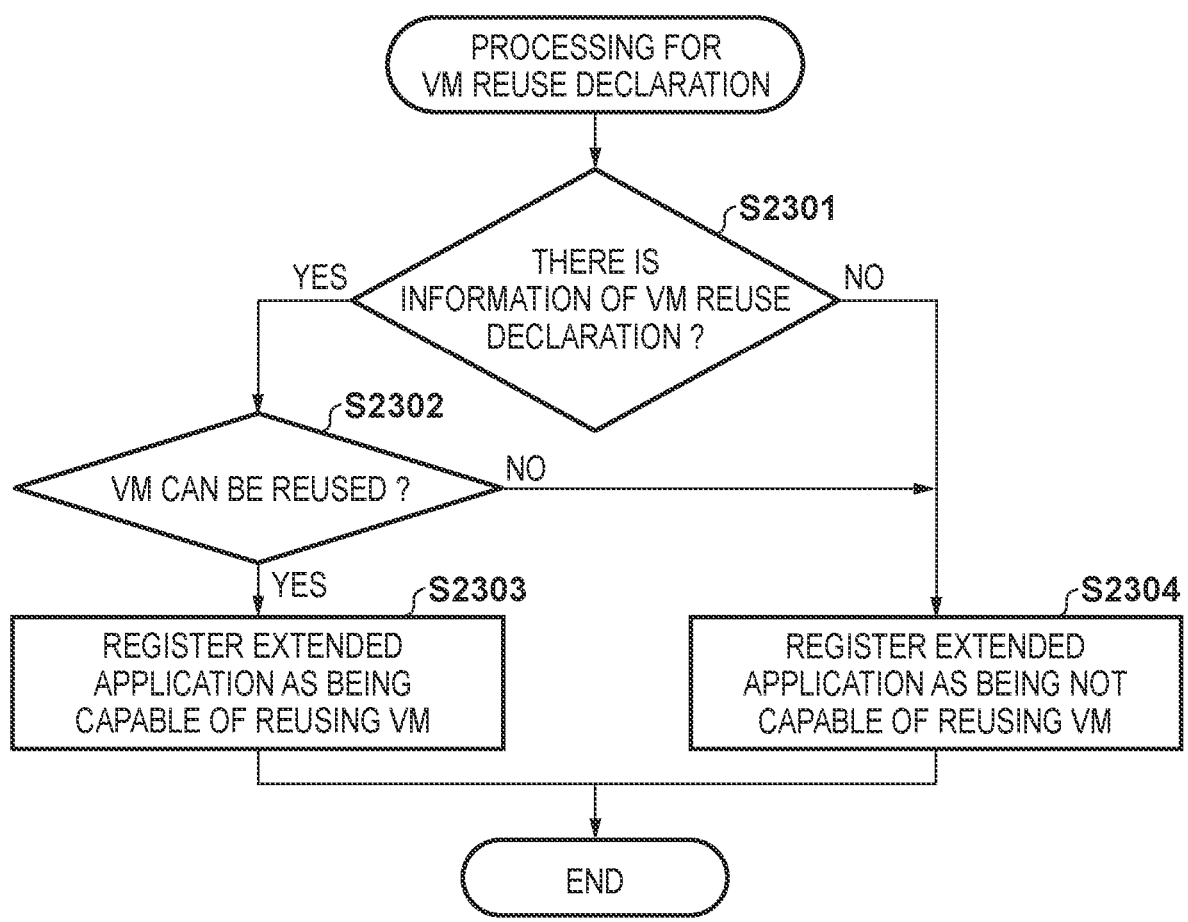

INFORMATION PROCESSING APPARATUS THAT DETERMINES WHETHER AN EXTENDED APPLICATION CAN REUSE A VIRTUAL MACHINE, METHOD OF CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

The functions of an image forming apparatus can be extended by installing an extended application in the image forming apparatus. In this case, the image forming apparatus has an execution environment for running the extended application separate from a control application of the image forming apparatus. Japanese Patent Laid-Open No. 2018-25909 discloses installing applications for extending functions in an image forming apparatus having limited resources, where icon information based on state changes can be registered for each application.

A virtual machine (VM) is needed to run extended applications installed in an image forming apparatus. "VM" refers to a virtually-constructed execution environment, and is a module which interprets and executes programs for controlling extended applications. Because the VM is configured in RAM, it is difficult to keep the VM running continuously on an image forming apparatus having limited resources. The VM is therefore launched and terminated each time an extended application is launched and terminated. However, the processing for launching and terminating the VM in this manner has significant overhead and thus takes a long time, which has caused drops in the processing performance of extended applications.

SUMMARY OF THE INVENTION

An aspect of the present invention is to eliminate the above-mentioned problem with conventional technology.

A feature of the present invention is to provide a technique which suppresses a drop in the processing performance of an extended application.

According to a first aspect of the present invention, there is provided an information processing apparatus that can execute an extended application, the apparatus comprising: at least one processor and at least one memory configured to function as: a holding unit that holds, in a launched state, a virtual machine (VM) for executing the extended application; a first determining unit that determines, in a case that the extended application is launched, whether or not the extended application can reuse the VM; a second determining unit that, in a case that the first determining unit has determined that the extended application can reuse the VM, determines whether or not the holding unit is holding a VM that can be reused by the extended application; and a control unit that, in a case that the second determining unit determines that the holding unit is holding the VM which can be reused by the extended application, executing the extended application using the VM that is held.

According to a second aspect of the present invention, there is provided a method of controlling an information processing apparatus that is able to execute an extended application, the method comprising: holding in memory, in a launched state, a VM for executing the extended application; determining, in a case that the extended application is launched, whether or not the extended application can reuse the VM; determining, in a case that it has been determined that the extended application can reuse the VM, whether or not the memory is holding a VM that can be reused by the extended application; and performing control so that, in a case that it has been determined that the memory is holding the VM which can be reused by the extended application, the extended application is executed using the VM that is held.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating an example of settings information of a form print application according to the embodiment.

FIG. 12 is a sequence chart for describing processing leading up to the launch of an application, performed when a musical score icon is pressed in a menu screen displayed on the console unit of the image forming apparatus, according to the embodiment.

FIG. 13 is a diagram illustrating an example of a table for managing information of extended applications installed in the image forming apparatus according to the embodiment.

FIG. 18 is a diagram illustrating an example of the data structure of a VM in RAM after given processing has been executed by an extended application, in the image forming apparatus according to the embodiment.

FIG. 19 is a flowchart for describing VM launching processing, performed in step S1701 of FIG. 17, in the image forming apparatus according to the embodiment.

FIG. 22 is a diagram illustrating an example of a metadata file that declares information of an extended application according to the embodiment.

FIG. 23 is a flowchart for describing processing for a VM reuse declaration in a metadata file, performed by an application management module of the image forming apparatus according to the embodiment.

DESCRIPTION OF THE EMBODIMENTS

An embodiment of the present invention will be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention. Also, a plurality of features may be arbitrarily combined. The following embodiment will describe an image forming apparatus such as a multifunction peripheral as an example of an information processing apparatus according to the present invention, but the present invention is not intended to be limited to such an image forming apparatus.

Figure 1:
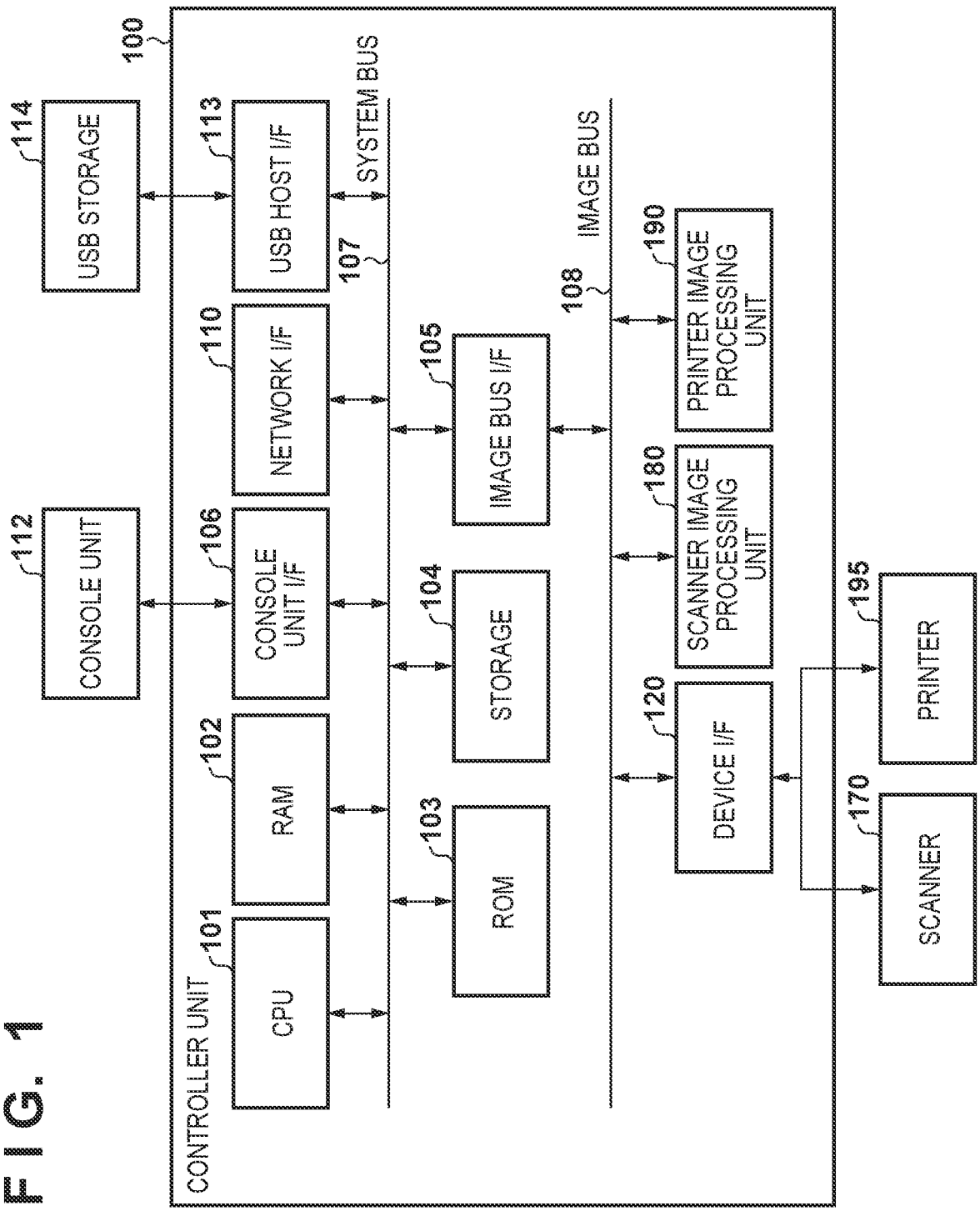
FIG. 1 is a block diagram for describing the configuration of the primary elements of an image forming apparatus according to an embodiment of the present invention.

FIG. 1 is a block diagram for describing the configuration of the primary elements of an image forming apparatus according to the embodiment of the present invention.

The image forming apparatus includes a controller unit 100. A scanner 170 and a printer 195 are connected to the controller unit 100, and a console unit 112 for providing a user interface is further connected to the controller unit 100. The controller unit 100 can control various units for implementing a copy function that uses the printer 195 to print image data read by the scanner 170.

The controller unit 100 includes a CPU 101. The CPU 101 executes a boot program stored in a ROM 103, and deploys, in a RAM 102, an operating system (OS), programs, and the like stored in a storage 104. The CPU 101 executes various types of processing (described later) by executing programs deployed in the RAM 102. The RAM 102 is used as a working area for the CPU 101. The RAM 102 provides the aforementioned working area and provides an image memory area for temporarily storing image data. The storage 104 stores programs, image data, and so on.

The ROM 103 and the RAM 102, a console unit I/F (console unit interface) 106, a network I/F (network interface) 110, a USB host I/F 113, and an image bus I/F (image bus interface) 105 are connected to the CPU 101 via a system bus 107. The console unit I/F 106 is an interface with the console unit 112, which includes a touch panel, and outputs image data to be displayed in the console unit 112 to the console unit 112 via the system bus 107. The console unit I/F 106 also sends information, input by the user in the console unit 112, to the CPU 101 via the system bus 107. The network I/F 110 is an interface for connecting the image forming apparatus to a LAN. The USB host I/F 113 communicates with a USB storage 114, stores data in the USB storage 114 in accordance with instructions from the CPU 101, and takes data stored in the USB storage 114 as an input and outputs that data to the system bus 107. The USB storage 114 is an external storage device that stores data, and can be attached to and removed from the USB host I/F 113. A plurality of USB devices, including the USB storage 114, can be connected to the USB host I/F 113.

The image bus I/F 105 functions as a bus bridge for connecting the system bus 107 and an image bus 108 that transfers image data at high speeds, and for converting data formats. The image bus 108 is constituted by a PCI bus, an IEEE 1394 bus, or the like. A device I/F 120, a scanner image processing unit 180, and a printer image processing unit 190 are provided on the image bus 108. The scanner 170 and the printer 195 are connected to the device I/F 120, and the device I/F 120 performs synchronous and asynchronous conversion on the image data. The scanner image processing unit 180 performs correction, processing, editing, and so on on image data input from the scanner 170. The printer image processing unit 190 carries out correction, resolution conversion, and so on in accordance with the printer 195, on image data output to the printer 195.

Figure 2:
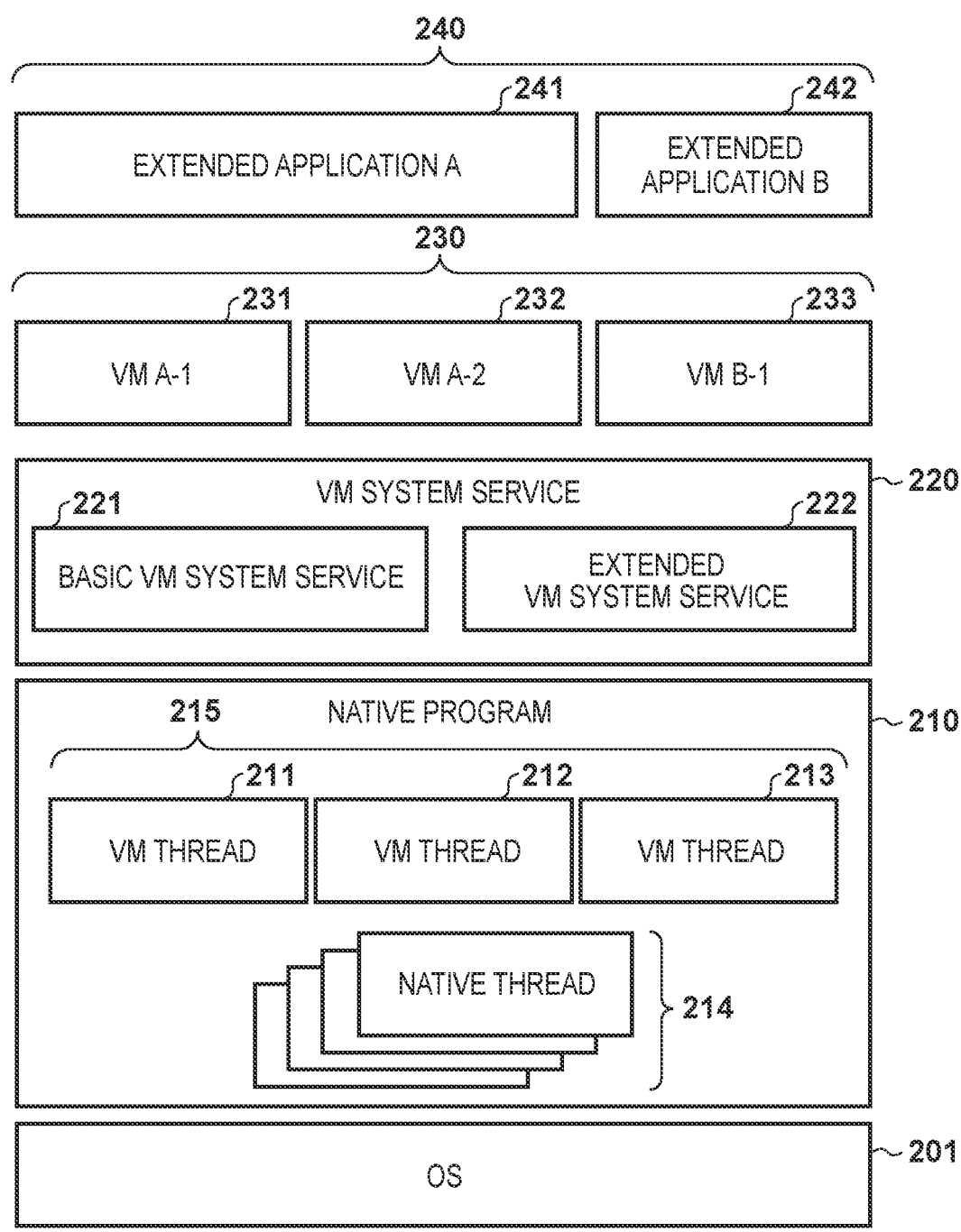
FIG. 2 is a block diagram for describing an example of an extended application execution environment in the image forming apparatus according to the embodiment.

FIG. 2 is a block diagram for describing an example of an extended application execution environment in the image forming apparatus according to the embodiment. Note that the functions of the modules illustrated in FIG. 2 are realized by the CPU 101 deploying programs stored in the storage 104 into the RAM 102 and executing those programs.

This image forming apparatus is an image forming apparatus to which an extended application can be installed as an add-in to extend the functions of the image forming apparatus. A native program 210 for controlling image processing units such as the printer, fax, and scanner, as well as virtual machines (VMs) 230 serving as execution environments for extended applications 240, run on an OS 201, which is an operating system. The VMs 230 are modules which interpret and execute programs for controlling the extended applications 240. The extended applications 240 always run on the VMs 230. The programs run on the VMs 230 run in accordance with commands specific to the VMs 230, which are different from the commands used by the CPU 101. These commands specific to the VMs 230 are called "byte code". On the other hand, commands specific to the CPU are called "native code". The VMs 230 sequentially interpret and process this byte code, and thus the native code runs on the CPU 101 and the byte code runs on the VMs 230. There are two types of VMs 230: a type that sequentially interprets and processes the byte code as-is, and a type that converts the byte code into native code and then executes the native code. Although the VMs 230 are the former type in the embodiment, the VMs 230 may be the latter type instead. Generally speaking, the commands run by a CPU will be incompatible with a CPU of a different type, and in the same manner, a command run by a VM will be incompatible with the VM of a different type. Furthermore, although the VMs 230 according to the embodiment are software modules run by the CPU 101, the VMs 230 may be hardware modules instead.

The native program 210 includes native threads 214 for controlling image processing units such as the printer, fax, and scanner, as well as VM threads 215 for operating the VMs 230. There are a number of VM threads 215 corresponding to the number of VMs 230. Here, three threads, namely VM threads 211, 212, and 213, are generated. Here, the three VM threads 211, 212, and 213 are provided so as to correspond to a VM A-1 (231), a VM A-2 (232), and VM B-1 (233).

A VM system service 220 is a utility library used in a shared manner from the extended application 240. By calling a function of the VM system service 220 from the extended application 240, the various modules of the image forming apparatus can be accessed while eliminating the burden of developing the extended application. The VM system service 220 includes a basic VM system service 221, which provides a minimum level of operations as a VM, and an extended VM system service 222, which provides access to the various modules in the image forming apparatus, OS functions, and the like. The basic VM system service 221 includes a function for loading extended applications. When the VM 230 executes an API designated by byte code of the extended application, a VM system service associated with that API is called. Using the extended VM system service 222, the extended application 240 can obtain configuration information of the image forming apparatus, such as, for example, a list of paper sizes which can be used for printing, whether or not color printing as possible, whether or not color judgment for print data is possible, a range of copies to be printed, and so on. Corresponding default setting values can also be obtained.

The VMs 230 execute the extended applications 240. The VMs 230 are generated for each thread of the extended application. In FIG. 2, the VM A-1 (231) and the VM A-2 (232) for running two threads in an extended application A241, and the VM B-1 (233) for running one thread in an extended application B242, are generated.

Meanwhile, an icon is displayed for each extended application in a main menu screen displayed on the console unit 112 of the image forming apparatus. When the console unit I/F 106 detects, through the console unit 112, that a user has selected an icon, the console unit I/F 106 notifies the CPU 101 thereof. Having received this notification, the CPU 101 launches the extended application corresponding to the icon selected by the user.

Figure 3:
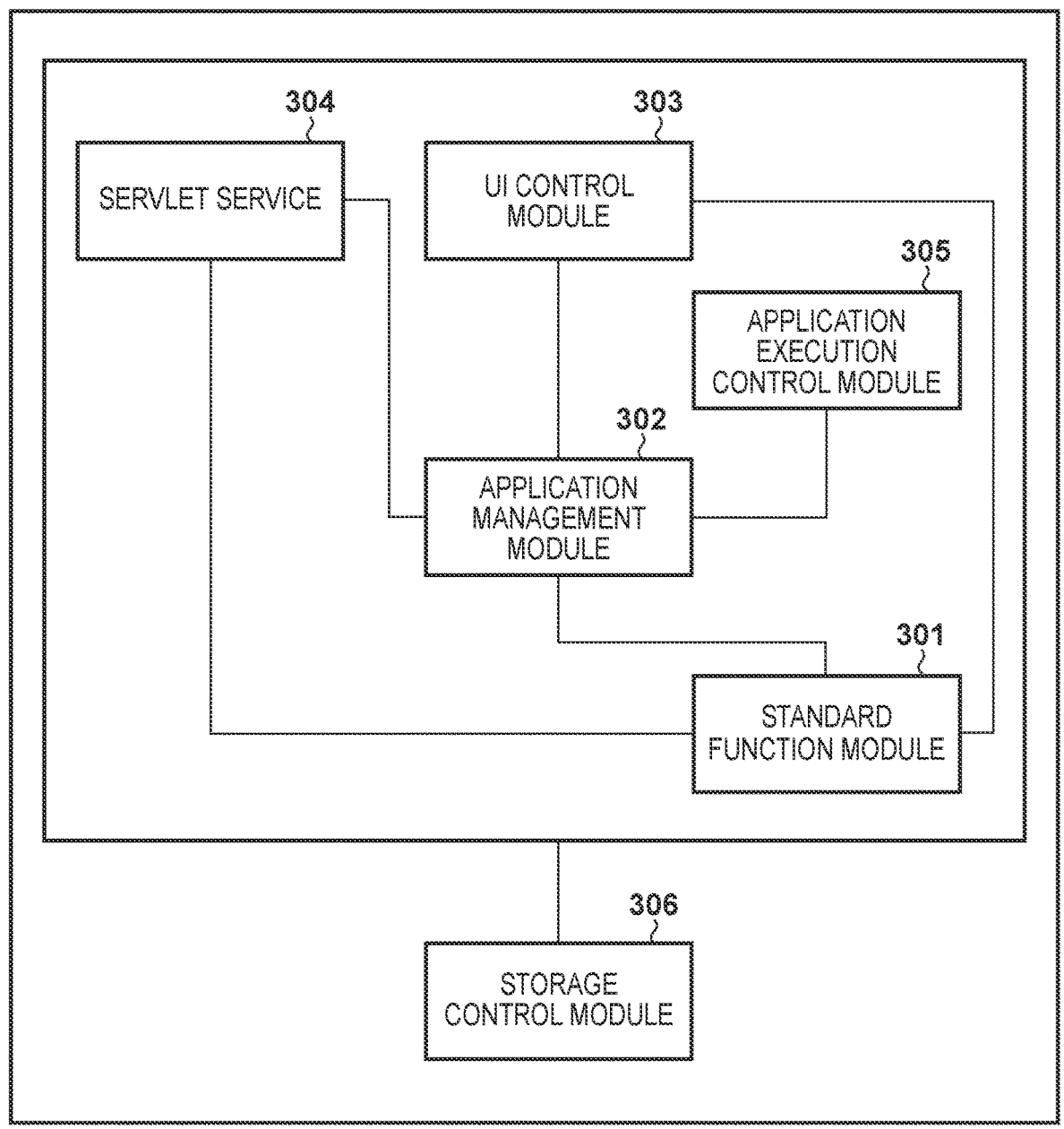
FIG. 3 is a block diagram for describing software modules executed by a CPU of the image forming apparatus according to the embodiment.

FIG. 3 is a block diagram for describing software modules executed by the CPU 101 of the image forming apparatus according to the embodiment.

When an HTTP access has been made via the network I/F 110, a servlet service 304 accepts that request and allocates processing to modules (an application management module 302 or a standard function control module 301) depending on the accessed URL. A user interface (UI) control module 303 displays screens on the console unit 112, accepts user operations via the console unit 112, and notifies the appropriate module (the application management module 302 or the standard function control module 301) of the resulting operation information. The application management module 302 is a module which manages the uninstalling, launching, the like of installed extended applications. An application execution control module 305 is a module which controls the execution of extended applications launched by the application management module 302. Specifically, the application execution control module 305 controls the VM threads 215, the VM system service 220, the VMs 230, and the extended applications 240. A storage control module 306 is a module which stores and manages settings information of the image forming apparatus. Each module accesses the storage control module 306 to refer to settings values, set the values, and so on. The standard function control module 301 is a module which controls copying, fax, and the like, which are standard functions of the image forming apparatus, and performs other control required by the image forming apparatus (e.g., controlling the USB host I/F 113).

Figure 4:
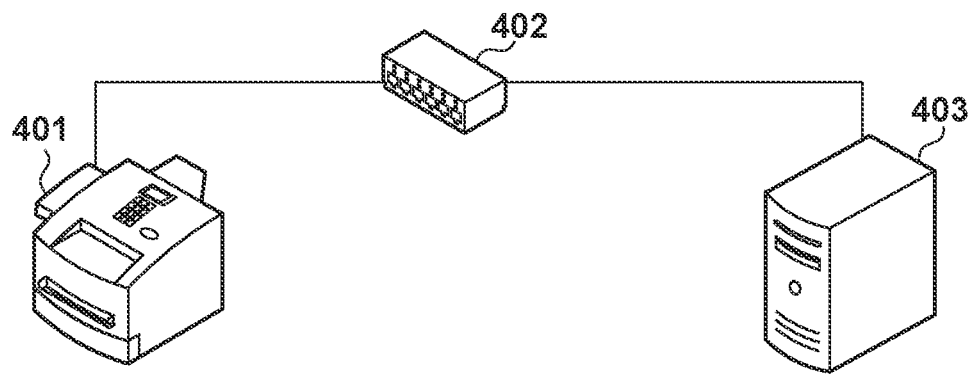
FIG. 4 is a diagram illustrating an example of the configuration of a printing system including the image forming apparatus according to the embodiment.

FIG. 4 is a diagram illustrating an example of the configuration of a printing system including the image forming apparatus according to the embodiment. This printing system includes an image forming apparatus 401, a network router 402, and an external device 403. Note that the image forming apparatus 401 corresponds to the image forming apparatus illustrated in FIG. 1.

The external device 403 uses an installer to install an extended application in the image forming apparatus 401, which is connected over a network. The external device 403 also connects to the image forming apparatus 401 via a browser and changes settings and so on of the extended application. The network router 402 relays communication between the image forming apparatus 401 and the external device 403. In response to a request to install an extended application from the external device 403, the image forming apparatus 401 executes processing for installing the extended application, and makes HTTP responses to HTTP requests.

Figure 5:
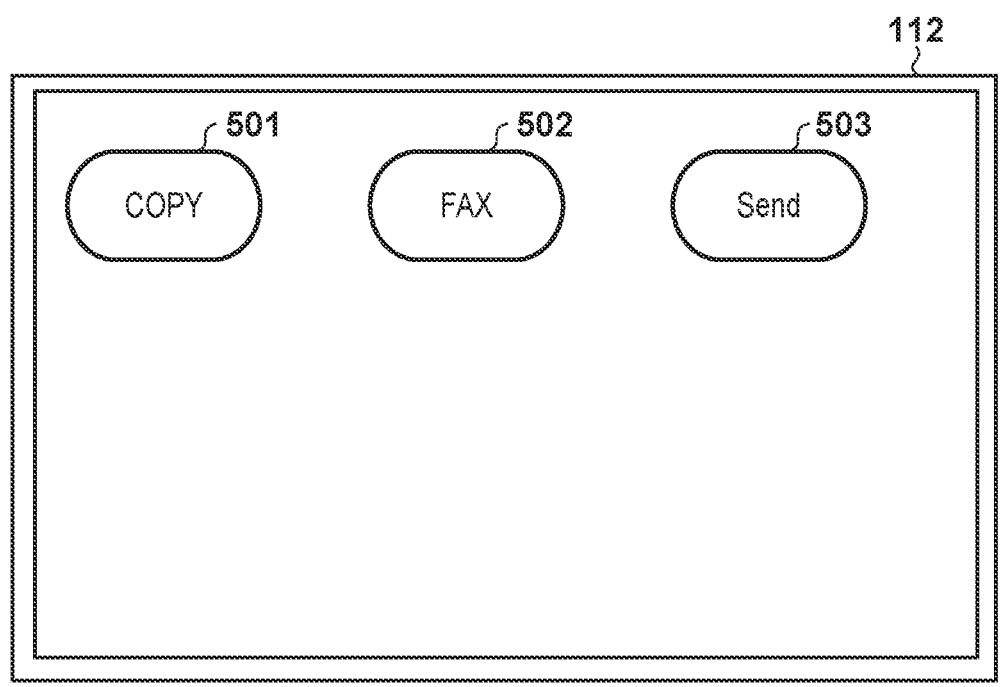
FIG. 5 is a diagram illustrating an example of a menu screen displayed on a console unit of the image forming apparatus according to the embodiment.

FIG. 5 is a diagram illustrating an example of a menu screen displayed on the console unit 112 of the image forming apparatus 401 according to the embodiment.

The image forming apparatus 401 has copy, fax, and send (transmitting image data obtained by a scanner) functions. Icons 501 to 503 for respectively calling these functions are displayed in the screen of the console unit 112. When the user presses the icon corresponding to a desired function by operating the console unit 112, the display makes transition to a screen for performing the desired function. Note that the icons in the screen illustrated in FIG. 5 all correspond to functions provided by native programs which the image forming apparatus 401 already includes.

Figure 6:
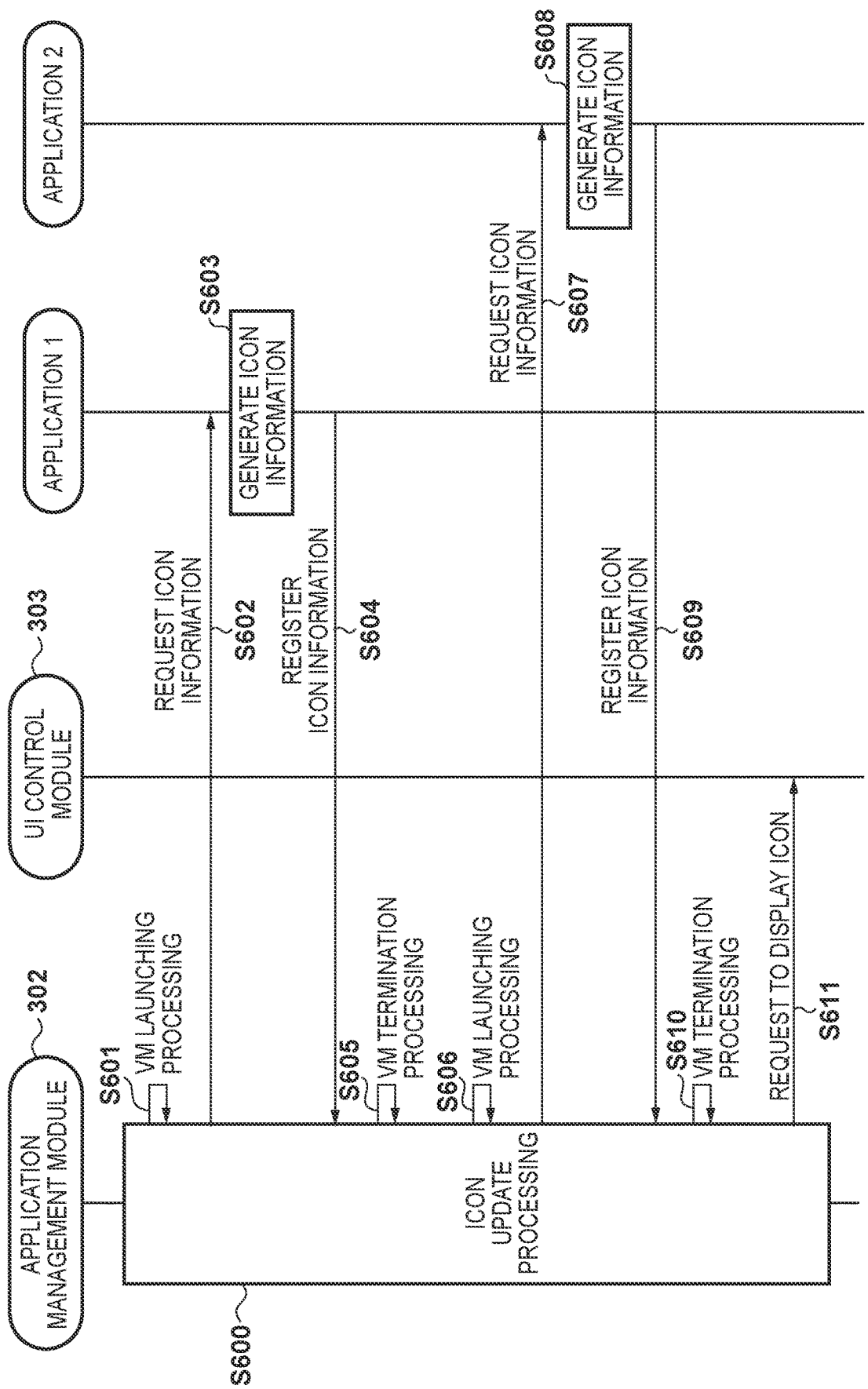
FIG. 6 is a sequence chart for describing the flow of icon updating processing, in which an icon of an extended application installed in the image forming apparatus is obtained and displayed, according to the embodiment.

FIG. 6 is a sequence chart for describing the flow of icon updating processing, in which an icon of an extended application installed in the image forming apparatus 401 is obtained and displayed, according to the embodiment. The following descriptions will assume that two extended applications, namely an application 1 and an application 2, have been installed in advance.

In step S601, the application management module 302 executes VM launching processing in order to launch the application 1. Then, in step S602, the application management module 302 requests the icon information from the application 1 for which launch preparation is complete. In response to the request, the application 1 executes an icon information generating process, described in the flowchart of FIG. 7, in order to generate the icon information. This processing will be described later with reference to FIG. 7. Next, in step S604, the application 1 registers the icon information using the icon information generated in step S603, and the processing by the application 1 then ends. Through this, the application management module 302 can obtain the icon information of the application 1. Next, in step S605, the application management module 302 performs VM termination processing in response to the processing by the application 1 ending. The icon information of the application 1 is registered in the application management module 302 through the processing of steps S601 to S605 described above.

Next, in steps S606 to S610, the application management module 302 executes, for the application 2, the same processing as the aforementioned processing executed for the application 1, and obtains the icon information of the application 2.

In step S611, which is performed after the icon information has been obtained for all of the installed extended applications in this manner, the application management module 302 issues, to the UI control module 303, a request to display the icons corresponding to the extended applications. As a result, a menu screen such as that illustrated in FIG. 10 described later, for example, is displayed on the console unit 112.

Figure 7:
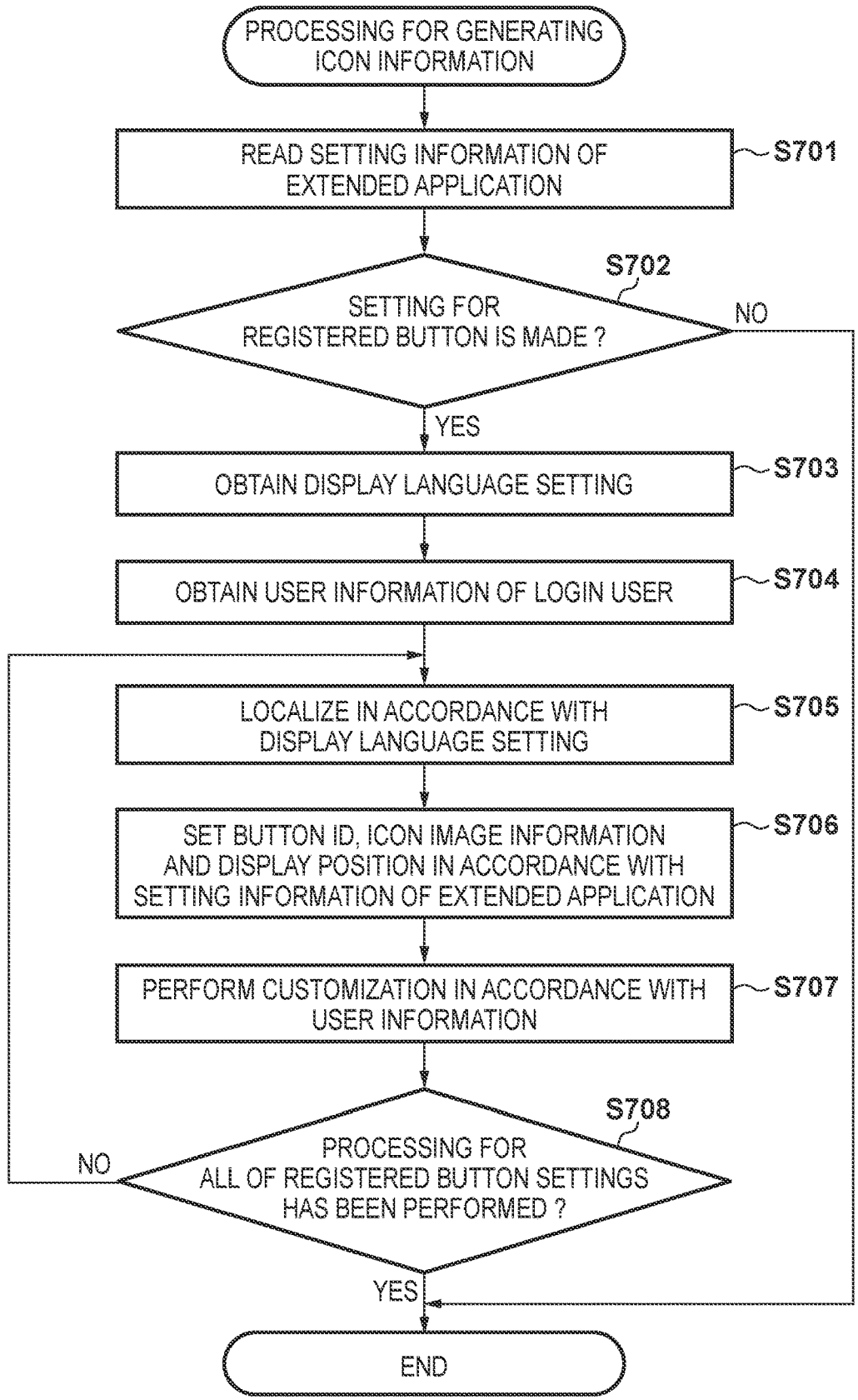
FIG. 7 is a flowchart for describing processing for generating icon information, executed by the extended application in steps S603 and S608 of FIG. 6.

FIG. 7 is a flowchart for describing processing for generating icon information, executed by the extended application in steps S603 and S608 of FIG. 6. Here, an example of processing for generating icon information will be described using a form print application, which prints form image data registered by the user, as an example of the extended application. Although the specific details of the processing differ from extended application to extended application, the basic processing is the same as the processing of the steps indicated here. It is assumed that the form print settings illustrated in FIG. 8 have already been registered in the form print application by a user in advance. Here, "musical score" is a form registered in advance as a sample for the extended application, and "application form" is a form registered by the user. The processing described in the flowchart of FIG. 7 is implemented by the CPU 101 executing a program deployed in the RAM 102, and thus the following descriptions assume that the processing is handled by the CPU 101.

First, in step S701, by functioning as the storage control module 306 for generating the icon information, the CPU 101 reads out the settings information of the extended application from the storage 104. Specifically, settings information of the extended application, such as that illustrated in FIG. 8, for example, is read out.

FIG. 8 is a diagram illustrating an example of the settings information of the form print application according to the embodiment.

The form print application performs processing in accordance with these settings. Form name 801 is a name indicating the content of the form, and is registered by the user. Here, "musical score" and "application form" are registered as form names. Button ID 802 is an ID identifying the icon, and is used when identifying a button that has been pressed. Form image file 803 indicates an image file to be printed in the form printing, and is registered by the user. Here, the image file for "musical score" is "score.dat", and the image file for "application form" is "SYORUI.dat". Print settings 804 is information including a color mode, a number of copies, and the like used when printing the form, and is registered by the user. Here, the print settings for "musical score" are stored in a file "Setting1.dat", whereas the print settings for "application form" are stored in a file "Setting2.dat". Icon image file 805 is a file that holds an image of the icon, and is registered by the user. Here, the icon image for "musical score" is stored in a file "Icon1.dat", whereas the icon image for "application form" is stored in a file "Icon2.dat". Localize 806 is information used when localizing the title of the icon. Here, a file "Localize.dat" is specified as information referred to when localizing the sample form "musical score" prepared in advance by the extended application. Note that there is no localization information in forms registered by the user. As such, the "application form" does not contain localization information. Display position 807 specifies a position where the icon is displayed in the screen. Here, the display position of the icon for "musical score" is set to the start, and the display position of the icon for "application form" is set to the end. User who can use 808 indicates the users who can use the form. All users can use "musical score", whereas only a user A can use "application form".

Next, the processing advances to step S702, where the CPU 101 confirms whether or not a setting has been made for a registered button set in the settings information of the extended application. If there is no setting here, the processing ends, but if there is a setting, the processing advances to step S703. In the example illustrated in FIG. 8, there is settings information for two forms, and thus the processing first advances to step S703 in order to generate the icon information for "musical score". In step S703, the CPU 101 obtains a display language setting set in the image forming apparatus 401 in order to localize the title of the icon. The processing then advances to step S704, where the CPU 101 obtains information of a user logged into the image forming apparatus 401 in order to perform customizations in accordance with the logged-in user. Assume here that the obtained user information is "user A".

Next, the processing advances to step S705, where the CPU 101 localizes the title of the icon in accordance with the display language setting obtained in step S703. Here, "musical score" is a form which is pre-registered in the extended application, and information for localizing the title of the icon has been prepared in the extended application in advance. As such, localization is performed in accordance with that information, on the basis of the display language setting. The processing then advances to step S706, where the CPU 101 sets the button ID, the icon image information, and the display position. In FIG. 8, "musical score" has a button ID of "0", an icon image file of "Icon1.dat", and the display position thereof is at the start. The image data used to display the icon of "musical score", and the display position thereof, are determined in this manner. The processing then advances to step S707, where the CPU 101 performs customization in accordance with the logged-in user. Then, the processing advances to step S708.

In the form print application, "user who can use" 808, which sets which user can use the form, is provided for each form. Accordingly, in step S707, the user set in the "user who can use" 808 is compared with the information of the user who is currently logged in, obtained in step S704, and if that user information matches the "user who can use" 808, the icon information of that form is generated. However, if the user information does not match the "user who can use" 808, the icon information is discarded.

With "musical score", the "user who can use" 808 is set to "all". The user information therefore matches the "user who can use" 808, and the icon information is generated. In step S708, the CPU 101 determines whether or not the above-described processing has been performed for all of the registered button settings. If the processing has not been carried out for all of the settings, the processing returns to step S705, and icon information is generated on the basis of the settings information of the next registered button. On the other hand, if the above-described processing has been performed for all of the registered button settings, the processing ends.

In the example illustrated in FIG. 8, "application form" is next, and thus the processing returns to step S705. In step S705, the CPU 101 is to localize the icon, but "application form" has been registered by the user and therefore does not have any localization information. As such, the title registered by the user is used as-is. The processing then advances to step S706, where the CPU 101 sets the button ID, the icon image information, and the display position. In FIG. 8, "application form" has a button ID of "1", an icon image file of "Icon2.dat", and the display position thereof is at the end. Next, the processing advances to step S707, where the CPU 101 performs customization for the logged-in user. Only user A is permitted to use "application form". As such, the icon information is generated if the user information obtained in step S704 is "user A", whereas the icon information is not generated if the user information is not "user A". Here, the logged-in user is the user A, and thus the icon information for "application form" is generated. The processing then advances to step S708, where the CPU 101 determines that the above-described processing has been performed for all of the registered button settings, and the processing ends.

Figures 9, 10:
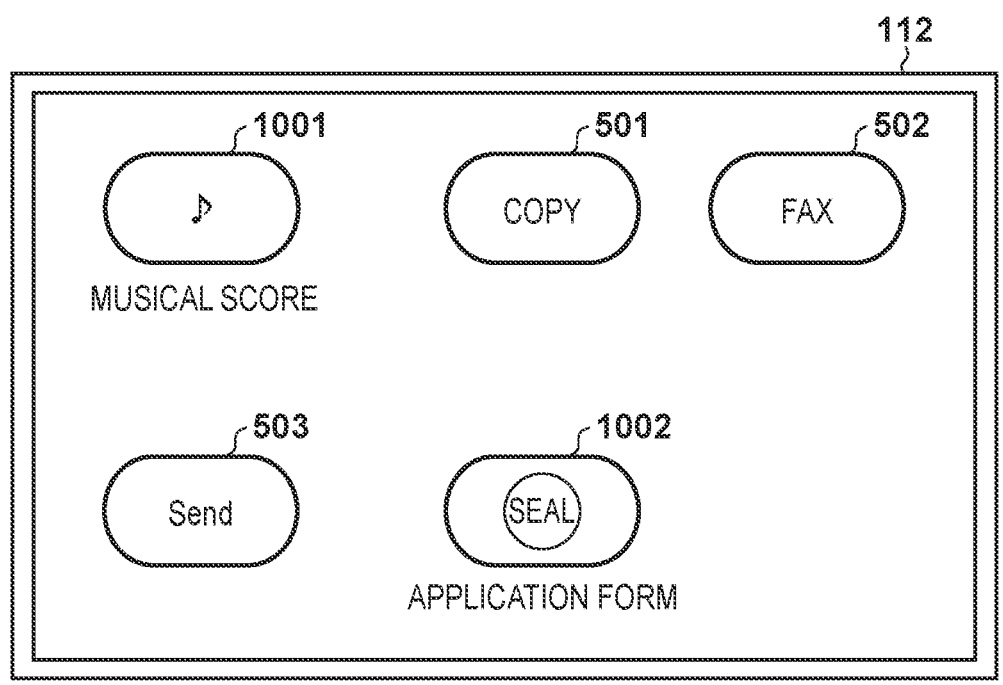
FIG. 9 is a diagram illustrating an example of generated icon information, according to the embodiment.
FIG. 10 is a diagram illustrating an example of a menu screen displayed on the console unit on the basis of the icon information illustrated in FIG. 9.

FIG. 9 is a diagram illustrating an example of generated icon information, according to the embodiment.

Application ID 901 is an ID identifying the extended application. An ID is assigned to each extended application when the extended application is developed. Button ID 902 is an ID identifying the button. Icon title 903 indicates a title used when displaying the icon. Display position 904 indicates an initial display position of the icon. The display position is set to the start or the end. Icon image information 905 indicates a file storing the image data of the icon image, and corresponds to the icon image file 805 illustrated in FIG. 8. Note that as described earlier with reference to FIG. 7, if the user information obtained in step S704 is not "user A", there is no icon information for the "application form" form.

FIG. 10 is a diagram illustrating an example of a menu screen displayed in the console unit 112 on the basis of the icon information illustrated in FIG. 9. Note that icons which are the same as in FIG. 5 are given the same reference signs.

Here, a musical score icon 1001 and an application form icon 1005 have been added, in addition to icons of the standard functions illustrated in FIG. 5, namely copy icon 501, fax icon 502, and send icon 503. The musical score icon 1001 is placed at the start, and the application form icon 1005 is placed at the end. These placements are based on the designations in display position 807 of the icon information.

Figure 11:
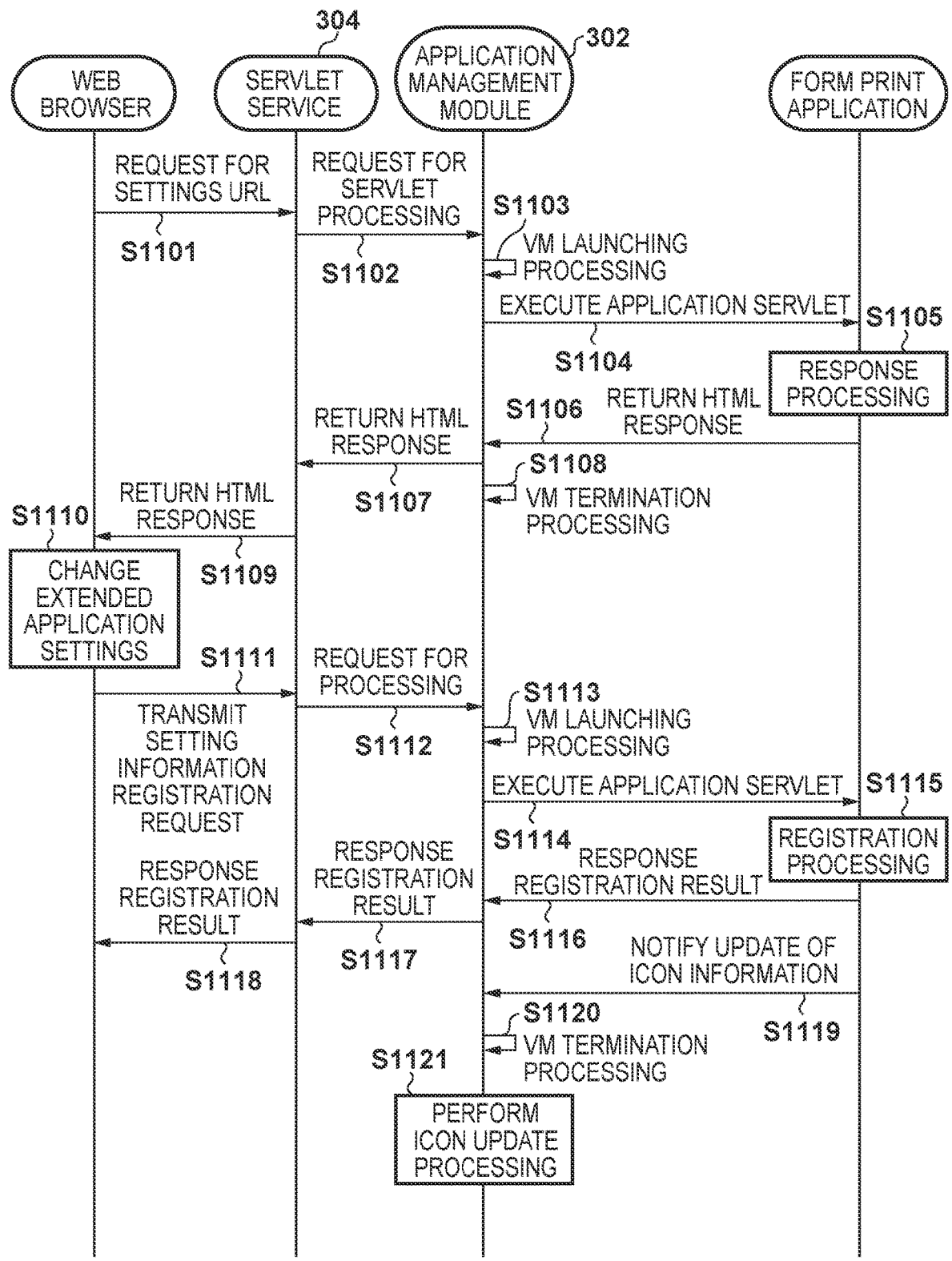
FIG. 11 is a sequence chart for describing processing for setting the extended application, performed for the image forming apparatus from an RUI, according to the embodiment.

FIG. 11 is a sequence chart for describing processing for setting the extended application, performed for the image forming apparatus 401 from an RUI, according to the embodiment. Here, an example of processing for generating icon information will be described using the form print application, which prints form image data registered by the user, as an example of the extended application. Although the specific details of the processing differ depending on the extended application, the basic processing is the same as the processing of the steps indicated here.

Settings are made for the extended application by connecting to the image forming apparatus 401 from a web browser running on the external device 403, and then making the settings through the web browser. First, in step S1101, servlet processing is requested by communicating, to the servlet service 304, information of a settings URL for setting the extended application, from the web browser. In response, in step S1102, the servlet service 304 requests the application management module 302 to perform servlet processing.

Accordingly, in step S1103, the application management module 302 specifies the extended application corresponding to the requested URL, and performs processing for launching the VM of the extended application. Next, in step S1104, the application management module 302 executes an application servlet. At this time, the form print application is notified of the information of the URL communicated from the web browser.

In response, in step S1105, the extended application performs response processing for responding to the URL request which has been made. Here, preparations are made for returning an HTML resource to the settings URL. An HTML form for referencing and setting the information indicated in FIG. 8, which is necessary for the form print processing, is written in the HTML resource. Then, in step S1106, the extended application returns the prepared HTML resource to the application management module 302, and the extended application is then terminated.

Accordingly, in step S1107, the application management module 302 returns the received response as-is to the servlet service 304. Next, in step S1108, the application management module 302 performs VM termination processing in response to the extended application terminating.

Additionally, in step S1109, the servlet service 304 returns the received response as-is to the web browser. In this manner, in step S1110, the user edits the screen displayed in the web browser and changes the extended application settings. Here, assume that the user has registered a new printing form. In step S1111, the web browser transmits a settings information registration request to the servlet service 304 in accordance with user operations. In response, in step S1112, the servlet service 304 requests the application management module 302 to perform that processing. Then, in steps S1113 to S1116, the application management module 302 specifies the extended application corresponding to the requested URL and executes the application servlet of the extended application, in the same manner as in steps S1103 to S1108 described above. The settings information of the requested printing form is then registered from the web browser.

Then, in step S1117, the application management module 302 returns the response received from the extended application to the servlet service 304 as-is. Additionally, in step S1118, the servlet service 304 returns the received response as-is to the web browser.

Furthermore, in step S1119, the extended application transmits an icon information update notification to the application management module 302 in order to register the icon of the registered form in the image forming apparatus 401. The extended application then terminates. Through this, the application management module 302 performs VM termination processing in step S1120 in response to the extended application terminating. Next, in step S1121, the application management module 302 performs icon update processing.

FIG. 12 is a sequence chart for describing processing leading up to the launch of the extended application, performed when the musical score icon 1001 is pressed in the menu screen displayed on the console unit 112 of the image forming apparatus 401, according to the embodiment.

When, in step S1201, the user presses an icon, the UI control module 303 detects the pressing of the icon. Then, in step S1202, the UI control module 303 obtains the application ID and the button ID from the icon information of the pressed icon, passes the application ID and the button ID to the application management module 302, and makes a request to launch the extended application. In the case of the musical score icon 1001, the application ID is "1" and the button ID is "0". At this time, the application management module 302 obtains, from an application ID management table illustrated in FIG. 13, an extended application matching the application ID for which the launch request was made. Then, in step S1203, VM launching processing for launching the corresponding extended application is performed. Next, in step S1204, the application management module 302 passes the button ID information to the launched extended application and requests processing to be performed.

At this time, according to FIG. 13, the application matching the application ID of "1" is the "application 1". Once the "application 1" is launched, in step S1205, the button which was pressed is recognized from the button ID information which has been passed, and processing is performed in accordance with the button. In the case of the form print application, the settings information illustrated in FIG. 8 is read out, and settings matching the button ID "0" are obtained. The image data of the form image file "score.dat", which is set to the button ID "0", is then printed in accordance with the print settings "Setting1.dat". After the printing processing ends, the extended application terminates as well. In response to the extended application terminating, in step S1206, the application management module 302 performs VM termination processing.

FIG. 13 is a diagram illustrating an example of a table for managing information of the extended applications installed in the image forming apparatus 401 according to the embodiment.

Application ID 1301 holds an ID which identifies an installed extended application. Application 1302 indicates the extended application corresponding to the application ID. This information is updated when an application is installed and uninstalled.

Figure 14:
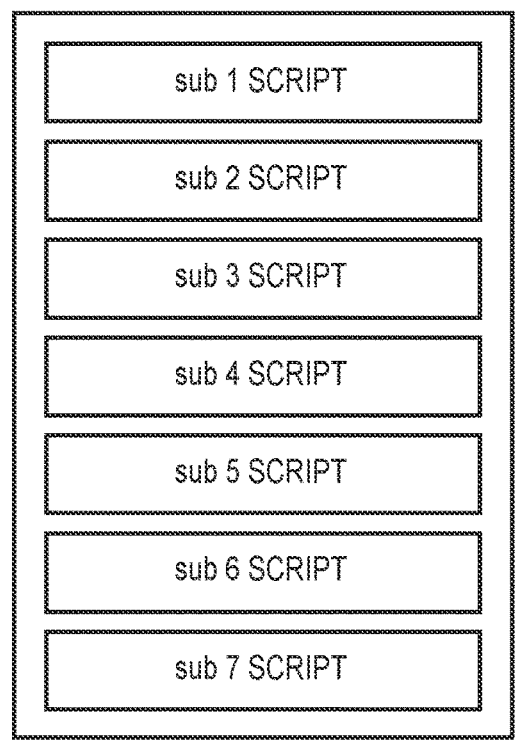
FIG. 14 is a diagram illustrating the configuration of an extended application according to the embodiment.

FIG. 14 is a diagram illustrating the configuration of the extended application according to the embodiment.

The extended application includes a plurality of files written in a dedicated language for execution using a VM, called "scripts". The extended application is controlled by scripts, and the number of scripts differs from extended application to extended application. The scripts are divided by function, and one or more scripts are used to implement one function of the corresponding extended application.

Figure 15:
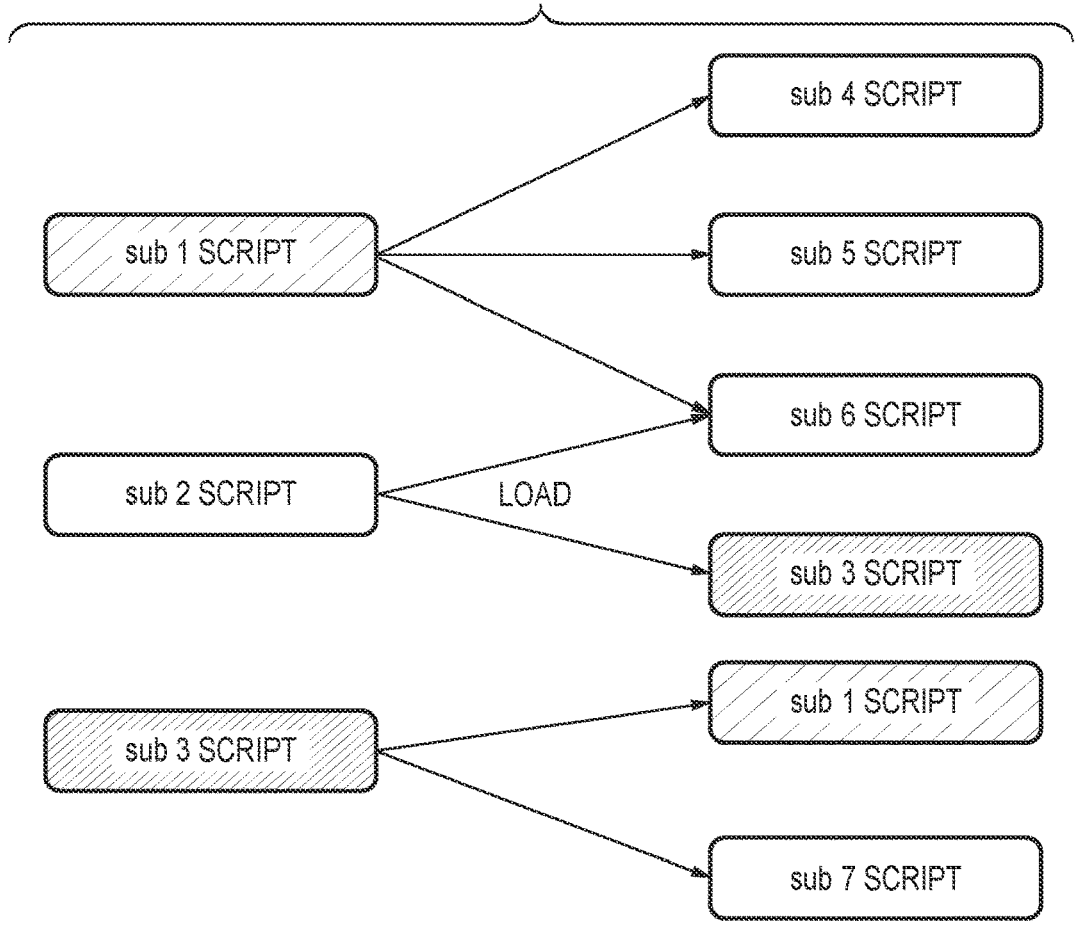
FIG. 15 is a diagram illustrating an example of dependency relationships between scripts of the extended application.

FIG. 15 is a diagram illustrating an example of dependency relationships between scripts of the extended application.

Generally speaking, when an application is executed on a PC, the application is executed after first reading the entire executable file and deploying the file in memory. However, the image forming apparatus 401 does not have the extensive memory resources as a PC, and thus the extended application is configured by dividing into a plurality of scripts respectively corresponding to functions. The scripts having the functions necessary for the processing of the extended application are then loaded into the RAM 102 and executed as needed. Using such a configuration makes it possible to reduce the memory resources required to execute the extended application.

As indicated in FIG. 15, when a sub1 script is loaded and executed, a sub4 script, a sub5 script, and a sub6 script are loaded while the sub1 script is being executed. Additionally, when a sub2 script is loaded and executed, a sub3 script and the sub6 script are loaded. Furthermore, when the sub3 script is loaded and executed, the sub1 script and a sub7 script are loaded.

The dependency relationships of the scripts differ from extended application to extended application, and the same script is sometimes loaded multiple times, as with the sub1 script and the sub3 script in this example. The same extended application may sometimes have different scripts loaded depending on the details of the processing. Because subscripts are loaded as necessary, it may take some time before the extended application is launched and the subscripts are loaded.

Figure 16:
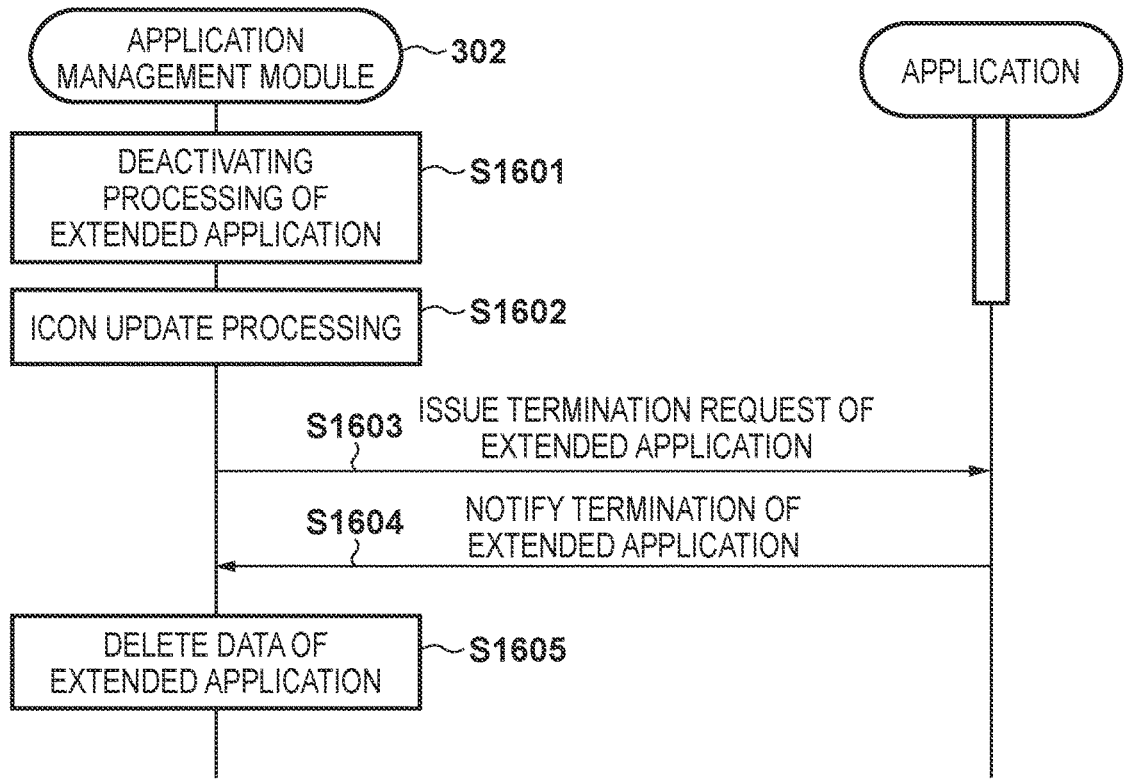
FIG. 16 is a sequence chart for describing the flow of icon updating processing for uninstalling an extended application from the image forming apparatus according to the embodiment.

FIG. 16 is a sequence chart for describing the flow of icon updating processing for uninstalling an extended application from the image forming apparatus 401 according to the embodiment.

In step S1601, the application management module 302 deactivates the extended application to be processed. Next, in step S1602, the application management module 302 performs icon update processing for updating the icon of the extended application which has been deactivated. Next, in step S1603, the application management module 302 issues a termination request to the extended application being processed. In response to the termination request, the extended application terminates in step S1604, and notifies the application management module 302 of the termination of the application. Accordingly, in response to the processing of the extended application terminating, the application management module 302 deletes the data of the extended application in step S1605. The extended application is deactivated, the icon is updated, and the extended application is uninstalled through this processing.

Figure 17:
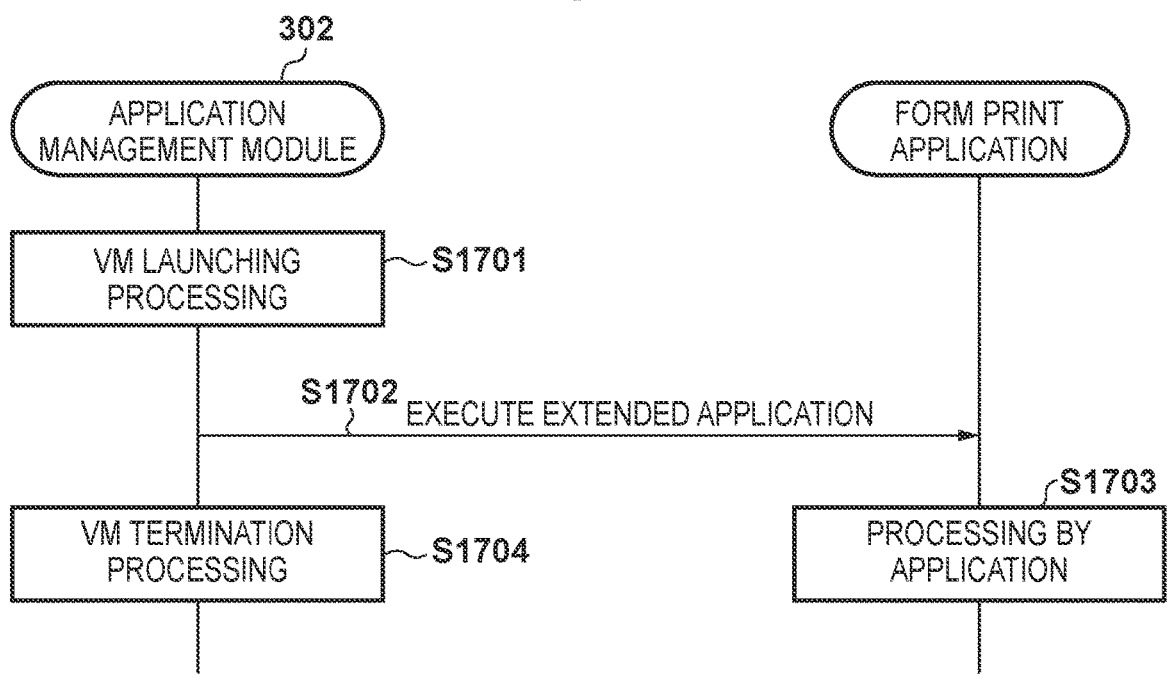
FIG. 17 is a sequence chart for describing processing from launching an application to terminating the application, according to the embodiment of the present invention.

FIG. 17 is a sequence chart focusing on the processing from launching the extended application to terminating the extended application in the image forming apparatus 401, according to the embodiment.

As described above, in step S1701, the VM launching processing is executed in order to execute the extended application. Through this launching processing, the VM is generated in the RAM 102, and the scripts of the extended application are loaded into the generated VM. The loaded scripts are then executed in step S1702. Through this, related scripts are loaded and executed in processing, and the extended application is executed. Once the extended application terminates, VM termination processing is executed in step S1704. The VM generated in the RAM 102 is released as a result of the VM termination processing.

This processing is performed each time a function of the extended application is executed. For example, with the web servlet illustrated in FIG. 11, the processing is performed with each HTTP access. At present, many web pages may seem simple at a glance, but are actually known to require multiple HTTP accesses. In this case, the longer the time taken by a single HTTP access, the longer it will take to update the web page, resulting in poor usability for users. This is not limited to the web servlet illustrated in FIG. 11, and reducing the time taken by the processing illustrated in FIG. 17 improves the performance of the image forming apparatus 401. As such, processing for shortening the execution time is performed in the VM launching processing of step S1701 and the VM termination processing of step S1704. This processing is a reuse of VM. In other words, by reusing the VM, rather than releasing the VM, the VM which has been executed once already, the amount of time required to generate the VM, load the scripts of the VM, and so on can be reduced. However, simply reusing a VM is problematic in terms of security, memory being used up, and so on, and thus a method which enables a VM to be reused while avoiding those problems will be proposed here.

FIG. 18 is a diagram illustrating an example of the data structure of a VM in the RAM 102 after given processing has been executed by an extended application, in the image forming apparatus 401 according to the embodiment.

A VM 1800 holds a script group 1801 which has been loaded, and working data 1802 which is set by the scripts. By reusing, rather than releasing, the VM in this state, the time required for the processing illustrated in FIG. 17 is shortened by skipping the processing for generating the VM and loading the scripts of the VM. Note that as illustrated in FIG. 18, the working data 1802 is held in the VM which is to be reused. If the VM is to be generated anew rather than being reused, all of the working data 1802 is cleared. With many extended applications, it is assumed that scripts are run in a state where the working data 1802 has been cleared. Accordingly, depending on the working data 1802 remaining in the VM being reused, scripts may operate in an unexpected manner and cause errors. Accordingly, rather than reusing a VM for all of the extended applications, whether or not reuse will be a problem is declared in advance on the extended application side, and the VM reuse processing is switched in accordance with the declaration.

FIG. 19 is a flowchart for describing VM launching processing, performed in step S1701 of FIG. 17, in the image forming apparatus 401 according to the embodiment. The VM launching processing is processing for preparing the VM for the execution of a predetermined extended application. Note that the processing described in this flowchart is implemented by the CPU 101 executing a program deployed in the RAM 102, and thus the following descriptions assume that the processing is handled by the CPU 101.

First, in step S1901, the CPU 101 confirms, in the predetermined extended application, the declaration as to whether or not the VM can be reused. As described earlier, this declaration is a declaration made in advance by the extended application as to whether or not the VM can be reused, and is associated with the extended application when the extended application is registered in the application management module 302. In step S1901, the processing advances to step S1902 if the CPU 101 determines that the extended application allows for reuse, and to step S1903 if not. In step S1902, it is confirmed whether or not there is a VM, among VMs held for reuse, which matches a condition for reuse. The condition confirmed here is assumed to be that the application IDs of the VMs which are held are the same, and the functions which are executed are the same as well. The "function" mentioned here is one of the icon registration processing illustrated in FIG. 6, the servlet processing described in FIG. 11, and the processing performed when an icon is pressed in the menu screen, described in FIG. 12. If, in step S1902, the CPU 101 determines that there is a VM which matches the condition, i.e., a VM which can be reused, the processing advances to step S1905, and if not, the processing advances to step S1903. In step S1903, the VM cannot be reused, and thus the CPU 101 newly generates a VM as per the normal processing. The processing then advances to step S1904, where the CPU 101 loads the scripts of the generated VM in order to control the function to be executed. The processing then ends. On the other hand, in step S1905, the CPU 101 has determined that there is a VM which matches the condition and therefore can be reused. The VM which is held is therefore reused, without a new VM being generated, and the processing then ends.

Note that when there are multiple extended applications which allow for VM reuse, the VM used for each extended application is managed using an ID, for example. Even in the same extended application, the VM which is reused switches depending on the function of the extended application using the VM. In other words, even when the extended application is the same, the VM which is reused differs between, for example, the processing for registering the icon of the extended application and when executing the extended application in accordance with the icon being specified.

Figure 20:
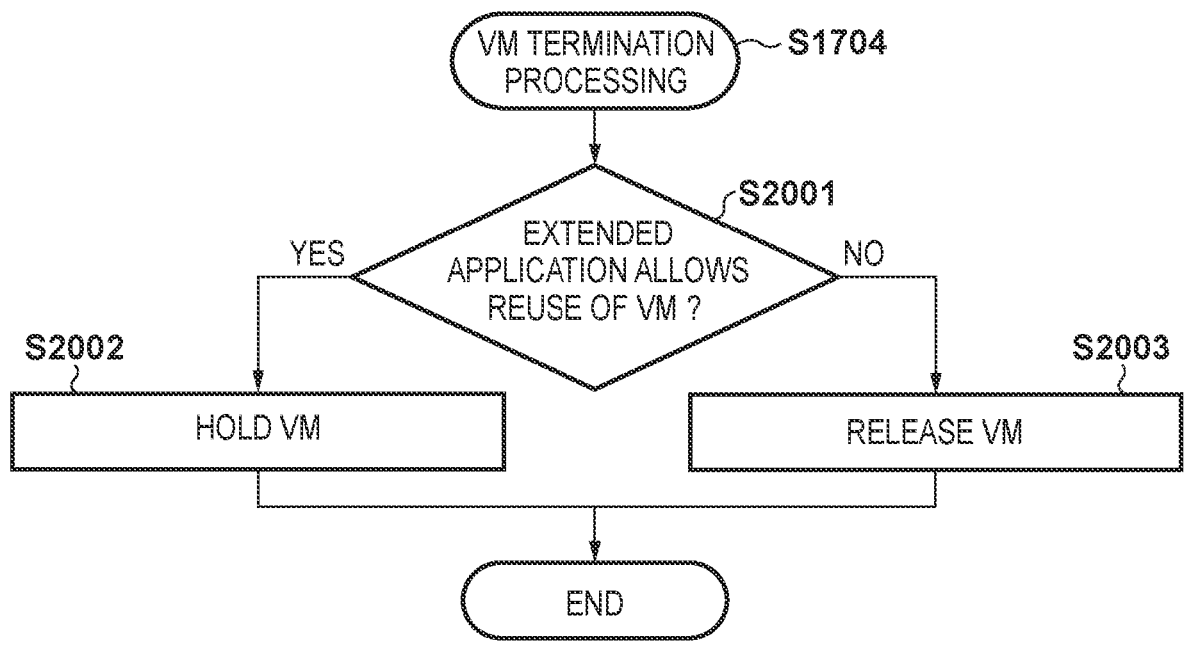
FIG. 20 is a flowchart for describing VM termination processing, performed in step S1704 of FIG. 17, in the image forming apparatus according to the embodiment.

FIG. 20 is a flowchart for describing VM termination processing, performed in step S1704 of FIG. 17, in the image forming apparatus 401 according to the embodiment. Note that the processing described in this flowchart is implemented by the CPU 101 executing a program deployed in the RAM 102, and thus the following descriptions assume that the processing is handled by the CPU 101.

First, in step S2001, the CPU 101 confirms whether or not a predetermined extended application is an application which can reuse the VM. If the VM can be reused, the processing advances to step S2002, whereas if the VM cannot be reused, the processing advances to step S2003. In step S2002, the CPU 101 holds the VM without releasing it so that the VM can be reused. The processing then ends. On the other hand, in step S2003, the CPU 101 releases the VM, and the processing ends.

Figure 21:
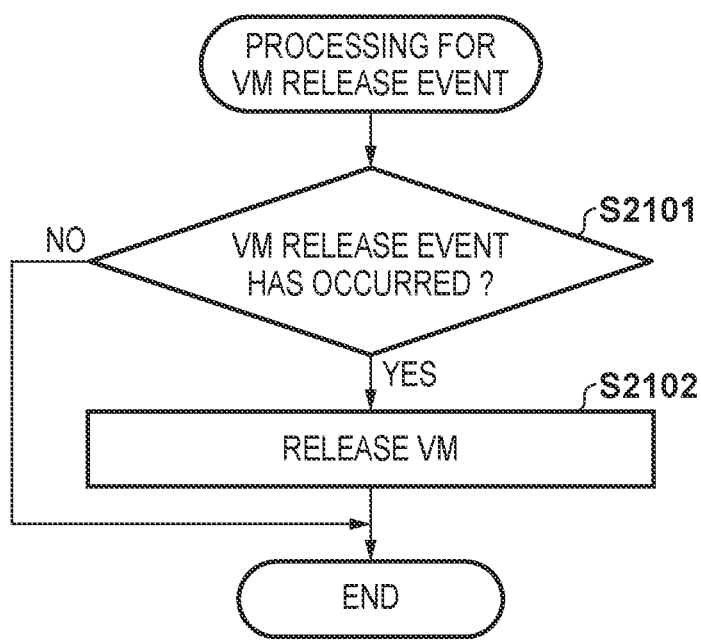
FIG. 21 is a flowchart for describing processing performed when an event for releasing a VM which is being held for reuse has occurred, in the image forming apparatus according to the embodiment.

FIG. 21 is a flowchart for describing processing performed when an event for releasing a VM which is being held for reuse has occurred, in the image forming apparatus 401 according to the embodiment. Although holding and reusing a VM can shorten the time taken by the processing described in FIG. 17, holding the VM uses up the RAM 102 and may cause unintended errors in the extended application. Accordingly, an event for releasing the VM is set, and the VM is released when the event occurs. Note that the processing described in this flowchart is implemented by the CPU 101 executing a program deployed in the RAM 102, and thus the following descriptions assume that the processing is handled by the CPU 101.

First, in step S2101, the CPU 101 determines whether or not a VM release event has occurred. The VM release event includes the deactivation of the extended application and a storage region in the memory being used up. If it is determined that a VM release event has occurred, the processing advances to step S2102, where the CPU 101 releases the held VM. The processing then ends. On the other hand, if it is determined that a VM release event has not occurred, the processing ends.

When a VM which had been held is released in this manner, the memory area (storage region) of the RAM 102 in which that VM had been deployed is released, and can then be used.

FIG. 22 is a diagram illustrating an example of a metadata file that declares information of an extended application according to the embodiment.

This metadata file declares what type of application the extended application is, and is provided for each extended application. The metadata file is read, and the information therein is registered, by the application management module 302 when the extended application is launched or installed. Here, reference numeral 2201 indicates an application identifying ID, which is used to identify the extended application. Reference numeral 2202 indicates a name of the extended application, which is used when displaying the name of the extended application. Reference numeral 2203 indicates a version of the extended application, which is used when managing the version of the extended application. Reference numeral 2204 declares whether or not the extended application is an application which can reuse a VM. In the example illustrated in FIG. 22, a declaration that the VM can be reused is made.

FIG. 23 is a flowchart for describing processing for a VM reuse declaration in the metadata file, performed by the application management module 302 of the image forming apparatus 401 according to the embodiment. Note that the processing described in this flowchart is implemented by the CPU 101 executing a program deployed in the RAM 102, and thus the following descriptions assume that the processing is handled by the CPU 101.

First, in step S2301, the CPU 101 determines whether or not there is information of the VM reuse declaration indicated by the reference numeral 2204 in FIG. 22. If this information is present, the processing advances to step S2302, and if not, the processing advances to step S2304. In step S2302, the CPU 101 determines whether or not the content of the declaration indicates that the VM can be reused. The processing advances to step S2303 if the VM can be reused, and to step S2304 if the VM cannot be reused. In step S2303, the CPU 101 registers the extended application as being capable of VM reuse, after which the processing ends. On the other hand, in step S2304, the CPU 101 registers the extended application as not being capable of VM reuse, after which the processing ends.

By performing such processing, extended applications which have existed since before VM reuse was supported can be run normally, which makes it possible to prevent the extended applications from operating erroneously.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-169577, filed Sep. 18, 2019, which is hereby incorporated by reference herein in its entirety.

What is claimed is:

1. An information processing apparatus that can execute an extended application having one or more functions, the apparatus comprising:
one or more memories configured to store instructions, a virtual machine (VM) for executing the extended application, and information associated with the extended application indicating whether or not the extended application allows for reusing VMs, wherein the VM for executing the extended application is separate from a control application of the apparatus and the VM is launched in response to detecting an execution environment capable of running the extended application separate from the control application;
one or more processors that, upon executing the stored instructions, function to determine, when a function of the extended application is to be executed, whether or not the extended application allows for reusing VMs based on the information;
in response to determining based on the information that the extended application allows for reusing VMs, determine whether a VM stored in the one or more memories matches a condition for reuse of the stored VM for the extended application, wherein the condition for reuse comprises determining whether the function of the extended application is the same as a function of the stored VM; and
if it is determined that the extended application allows for reusing VMs and it is determined that the stored VM matches the condition for reuse, perform control to execute the function of the extended application using the stored VM.

2. The information processing apparatus according to claim 1,
wherein in a case that it is determined that the extended application does not allow for reusing VMs, or in a case that it has been determined that the stored VM does not match the condition for reuse, the one or more processors function to perform control so that a new VM for executing the extended application is generated and the function of the extended application to be executed is executed using the new VM.

3. The information processing apparatus according to claim 1,
wherein the one or more processors further execute the instructions to, when the extended application is terminated, determine whether or not the extended application allows for reusing VMs,
wherein in a case that it is determined upon termination that the extended application allows for reusing VMs, the one or more memories store the VM being used by the extended application without terminating the VM.

4. The information processing apparatus according to claim 3,
wherein the determination upon termination of whether or not the extended application allows for reusing VMs is based on the information.

5. The information processing apparatus according to claim 1,
wherein it is determined that the stored VM matches the condition for reusing the VM for the extended application when the extended application for which the function is to be executed is the same as the extended application which had been executed by the stored VM.

6. The information processing apparatus according to claim 1, wherein it is determined that the extended application for which the function is to be executed is the same as the extended application for which the stored VM had been executed when an ID for the extended application for which the function is to be executed is the same as an ID for the extended application for which the stored VM had been executed.

7. The information processing apparatus according to claim 1,
wherein the function to be executed includes one of processing for registering an icon corresponding to the extended application, servlet processing performed in accordance with an HTTP request made to the extended application from a web browser, and processing performed when the icon is designated.

8. The information processing apparatus according to claim 1,
wherein the one or more processors, upon execution of the stored instructions, further function to detect an occurrence of an event for releasing the VM stored in the one or more memories; and
release the VM stored in the one or more memories in response to detecting the occurrence of the event.

9. The information processing apparatus according to claim 8,
wherein the event is at least one of the extended application being deactivated and a storage region, in the one or more memories, being used up.

10. The information processing apparatus according to claim 1,
wherein the extended application is activated by an HTTP request from a web browser.

11. The information processing apparatus according to claim 1,
wherein the extended application is activated by designating an icon corresponding to the extended application.

12. The information processing apparatus according to claim 1, wherein, in a case that it is determined that the extended application does not allow for reusing VMs, control is performed to generate a VM for executing the extended application and executes the extended application using the generated VM.

13. A method of controlling an information processing apparatus having one or more memories that store instructions, a virtual machine (VM) for executing an extended application having one or more functions, and information indicating whether or not the extended application allows for reusing VMs, wherein the VM for executing the extended application is separate from a control application of the apparatus and the VM is launched in response to detecting an execution environment capable of running the extended application separate from the control application, the method comprising:
determining, when a function of the extended application is to be executed, whether or not the extended application allows for reusing VMs based on the information;
in response to determining based on the information that the extended application allows for reusing VMs, determining whether a VM stored in the one or more memories matches a condition for reuse of the stored VM for the extended application, wherein the condition for reuse comprises determining whether the function of the extended application is the same as a function of the stored VM, and
if it is determined that the extended application allows for reusing VMs and it is determined that the stored VM matches the condition for reuse, performing control so that the function of the extended application is executed using the stored VM.

14. A non-transitory computer-readable storage medium storing a program for causing a processor to execute a method of controlling an information processing apparatus having one or more memories that store instructions, a virtual machine (VM) for executing an extended application having one or more functions, and information indicating whether or not the extended application allows for reusing VMs, wherein the VM for executing the extended application is separate from a control application of the apparatus and the VM is launched in response to detecting an execution environment capable of running the extended application separate from the control application, the method comprising:
determining, when a function of the extended application is to be executed, whether or not the extended application allows for reusing VMs based on the information;
in response to determining based on the information that the extended application allows for reusing VMs, determining whether a VM stored in the one or more memories matches a condition for reuse of the stored VM for the extended application, wherein the condition for reuse comprises determining whether the function of the extended application is the same as a function of the stored VM, and
if it is determined that the extended application allows for reusing VMs and it is determined that the stored VM matches the condition for reuse, performing control so that the function of the extended application is executed using the stored VM.

* * * * *